United States Patent [19]

McSwain

[11] 3,768,540
[45] Oct. 30, 1973

[54] RETRACTIBLE CANOPY SHELTER

[76] Inventor: Thad M. McSwain, 1908 S. Columbus, Stuttgart, Ark. 72160

[22] Filed: June 17, 1971

[21] Appl. No.: 153,951

[52] U.S. Cl. ............ 160/23 R, 160/271, 160/273 R, 160/392, 296/105
[51] Int. Cl. .............................................. A47k 3/00
[58] Field of Search ..................... 160/23 R, 26, 272, 160/273, 368 R, 392, 395, 270, 271; 296/100–105

[56] References Cited
UNITED STATES PATENTS

| | | | |
|---|---|---|---|
| 2,594,910 | 4/1952 | Germann | 160/271 |
| 2,886,104 | 5/1959 | Swan | 160/273 R |
| 2,985,483 | 5/1961 | Bishop et al. | 296/105 |
| 3,051,232 | 8/1962 | Lamb | 160/368 R |
| 2,754,899 | 7/1956 | Karobonik et al. | 160/23 R |
| 2,958,083 | 11/1960 | Shook et al. | 160/26 |
| 3,146,824 | 9/1964 | Veilleux | 160/23 R |

*Primary Examiner*—Peter M. Caun
*Attorney*—Clarence A. O'Brien and Harvey B. Jacobson

[57] ABSTRACT

A retractible panel construction, primarily in the nature of a canopy, comprising a storage roller mounted flexible panel selectively extended along and guided by a pair of laterally spaced track defining rails. Movement of the panel is controlled by a pair of panel mounted cables which engage and guide along the tracks with the panel extending from the storage roller to the remote end of the area to be covered, the control cables engage about idler pulleys and are selectively wound on a take-up roller. The panel, when extended, incorporates a transversely arcuate rigidifying configuration.

1 Claim, 6 Drawing Figures

PATENTED OCT 30 1973

Thad M. McSwain
INVENTOR.

BY Clarence A. O'Brien
and Harvey B. Jacobson
Attorneys

Thad M. McSwain
INVENTOR.

BY Clarence A. O'Brien
and Harvey B. Jacobson
Attorneys

RETRACTIBLE CANOPY SHELTER

The present invention is generally concerned with a retractible track guided panel, and is more particularly concerned with a canopy utilizable in any conceivable environment wherein a retractible cover is desired, whether this be on open top trucks, trailers, railroad cars, boats, carports, patios, shelters, and the like.

It is a primary object of the instant invention to provide a unique canopy construction which is adapted for incorporation, either as original equipment or as an accessory, into any structural environment wherein a retractible cover is desired, including vehicles of all types, permanent shelters and general areas such as walkways, entrances, loading docks, and the like.

In conjunction with the above object, it is also a highly significant object of the instant invention to provide a retractible shelter which is in effect a self-sustained unit incorporating, in addition to the movable panel itself, storage means therefor, control means for effecting the extension and retraction thereof, and guide means for properly positioning the panel throughout the range of adjustment thereof.

Further objects of the invention include the provision of a canopy which, regardless of the environment, can be easily installed and operated, notwithstanding the uniqueness of the construction thereof and the effectiveness of the shelter provided thereby.

Likewise, it is an object of the instant invention to provide a cover panel which is flexible in nature so as to be compactly stored on a storage roller with specific provisions being made so as to guide the panel into a transversely arcuate configuration in its extended position thereof so as to insure a substantial degree of structural rigidity notwithstanding the flexbile nature of the panel.

In addition, a significant object of the invention resides in the position of integral seal means whereby an automatic sealing of the panel is effected in conjunction with the extension thereof, as well as a peripheral tieing down of the panel.

Basically, the objects of the instant invention are achieved through the provision a retractible canopy defining panel which is stored on an enlarged storage roller and selectively moved therefrom between and along a pair of laterally spaced parallel rails. The rails incorporate internal tracking grooves which receive and guide depending flanges on the panel. Movement of the panel is effected through the use of elongated cables engaged with the depending flanges and travelling within the track grooves. The take-up of the cables, so as to effect the extension of the panel, is provided for by a pick-up roller with both rollers normally being provided in parallel adjacent relationship with each other within an enlarged protective housing which easily mounts across one end of the area to be covered, the remote end of the area incorporating tie-down means for the panel and idler pulleys for the control cables.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
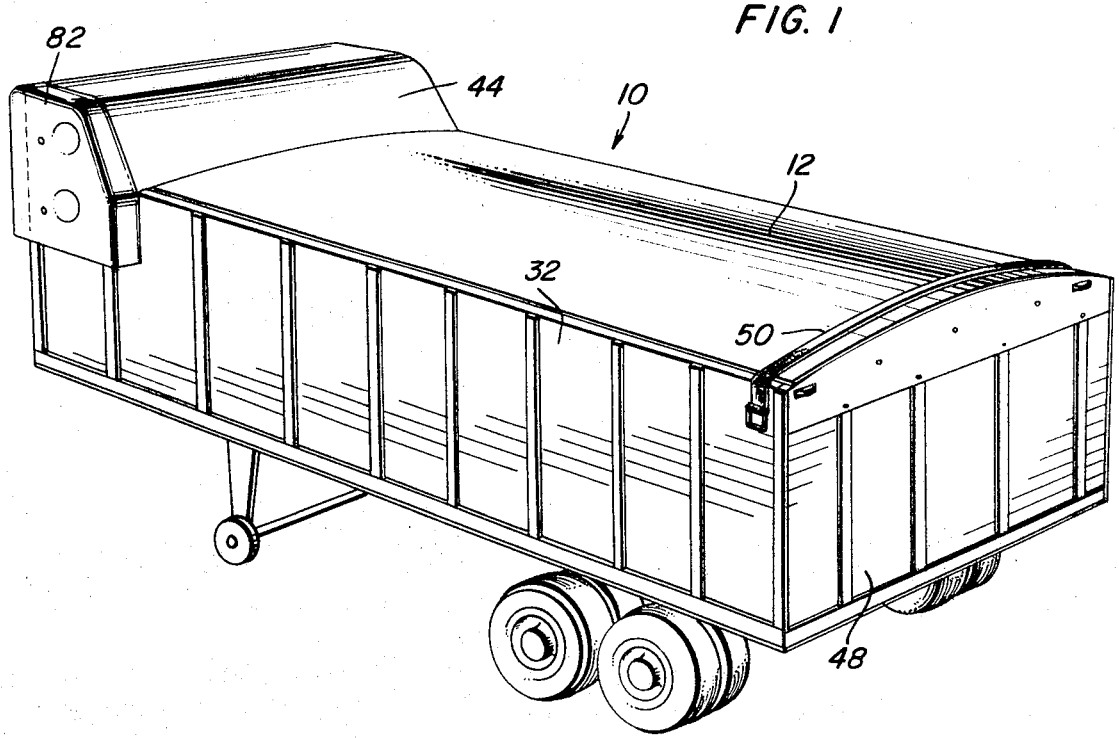
FIG. 1 is a perspective view of an open top vehicle having the retractible panel of the instant invention mounted thereon.
Figure 6:
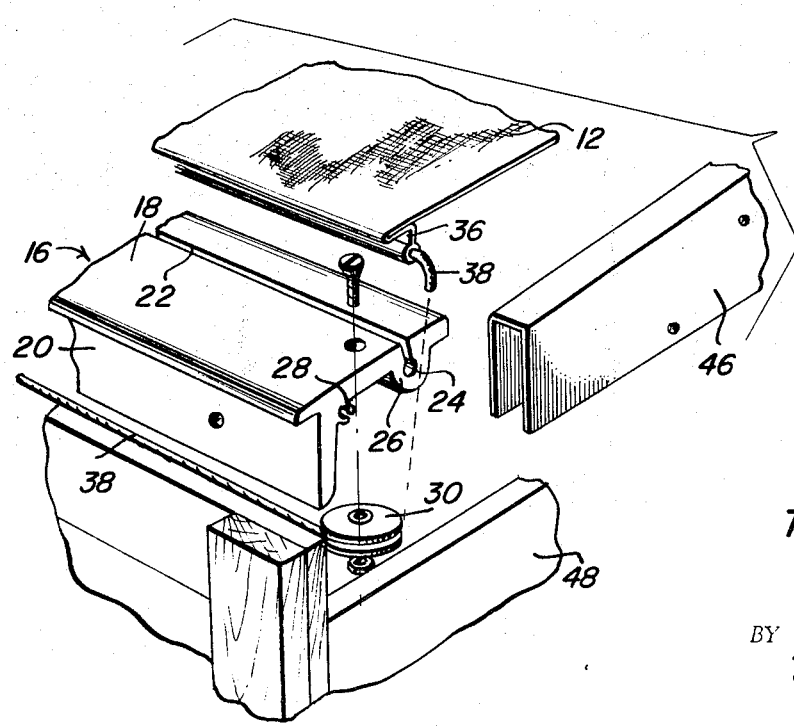
FIG. 6 is a perspective detail of the various strucural elements at the remote end of the canopy construction.

Referring now more specifically to the drawings, reference numeral 10 is used to generally designate the apparatus comprising the instant invention. This apparatus, for purposes of illustration, is set forth in the drawings as constituting an attachment mounted on an open top van or trailer. However, it should be appreciated that, as indicated supra, the construction is adapted for use in a wide variety of installations.

The actual panel, canopy or cover 12 is formed by a relatively wide elongated length of material which, while sufficiently flexible for rolling on a storage roller 14, is capable of being self-sustaining when extended from the roller. Any appropriate material can be utilized, for example a thin flexible metal or plastic, the convex configuration assumed upon an extension of the panel 12 substantially contributing to the rigidity thereof.

The storage roller 14 is positioned slightly above and transversely across one end of a pair of laterally spaced rails 16 which extend the length of the area to be covered in order to provide a base and guide for the extended panel or cover 12. Each rail 16, which can be rigid or sufficiently flexible for coiling so as to facilitate the shipment or storage thereof, includes a horizontal top flange 18 and an integral full-length vertical depending flange 20 provided just inward of the outer edge of the top flange 18 so as to provide a slight overhang. An elongated guide slot 22, with full length enlarged or bulbous lower end 24, is provided in the top flange 18 toward the inner edge thereof with the top flange being integrally enlarged downward about the slot 22, as indicated by reference numeral 26, so as to accommodate the slot 22 and bulbous inner end 24 and provide the necessary stability to the top flange 18 in this area. An integral enlargement is also provided at the inner corner defined between the top flange 18 and the vertical flange 20 with this enlargement having a full length undercut cable groove 28 defined therein. Finally, each rail 16, at the end of remote from the storage roller 14, mounts on idler pulley 30 immediately below the top flange 18 and between the cable groove enlargement and the enlargement 26 surrounding the slot 22.

Figure 3:
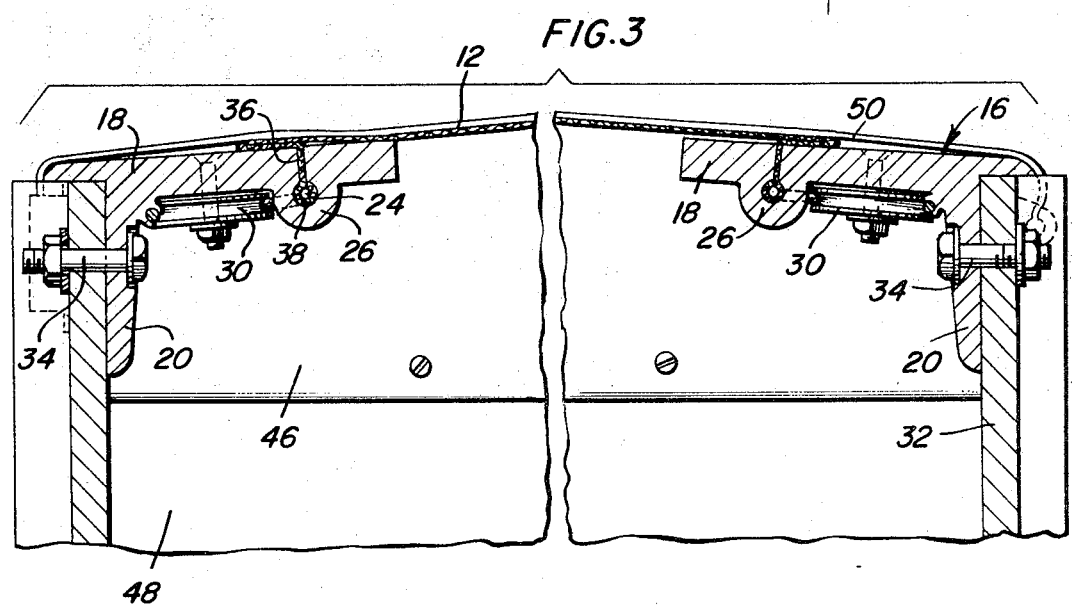
FIG. 3 is a transverse cross-sectional view taken substantially on a plane passing along line 3—3 in FIG. 2.

With reference to FIG. 3 in particular, it will be noted that the vertical rail flange 20 functions as a means for a mounting of the rail on the side wall 32 of the enclosure to which the apparatus is to be affixed, the mounting being effected by appropriate bolt and nut means 34. When mounted, the outer edge overhang provided by the top flange 18 projecting beyond the vertical flange 20 overlies and protectively encloses the upper wall edge. It will of course be appreciated that the full length vertical flange 20 would function equally well as a means for mounting the rail 16 between posts and the like where the specific rigidity of the rail 16 itself depending upon the particular environment of the installation.

The panel 12 includes a full length depending flange 36 in parallel inwardly spaced relation adjacent to each edge thereof. These depending flanges 36, which will preferably be integrally formed with the panel 12 and collapsible thereagainst upon a rolling of the panel 12 on the storage roller 14, mount, in each instance, an elongated control cable 38 along the lower edge thereof providing in effect a bulbous lower edge configuration. Each panel flange 36 is slideably received within one of the rail grooves 22 while the cable formed bulbous lower portion thereof is slideably received within the enlarged lower end 24 of the associated groove or slot 22 for smooth travel therealong.

Each cable 38 is affixed to the corresponding panel flange 36 and extends beyond the outer or leading end of the panel 12 about the corresponding rail pulley 30 and back along the rail 16 through the cable groove 28 which retains the cable 38 against lateral displacement while allowing for the free longitudinal movement thereof. The remote end of each cable 38 is engaged with a take-up roller or reel 40 mounted parallel to the storage roller 14 in spaced relation there below.

As may readily be appreciated, the full length panel flange 36 along each edge of the panel 12 provides for a highly effective weather seal with the bulbous nature of the lower edge along each of the flanges 36 producing a full length tie-down arrangement along the panel edge without requiring the use of buttons, hooks, ropes or the like. It is contemplated that each flange 36 be of a height so as to snugly engage the panel with the rail 16 as indicated in FIG. 3. This feature, in conjunction with the slight upward convex configuration of the panel providing, in addition to an effective weather seal along each edge of the panel, a run-off for rain, snow and the like to avoid any possible damaging accumulation.

The desired upwardly convex configuration for the panel 12 is effected by providing a panel 12 of a slightly greater width than the spacing between the support rails 16 whereby, as the panel 12 moves from the storage roll 14, there is a tendency for the panel 12 to upwardly deflect as the panel flanges 36 move along the respective rail slots 22. The deflection of the panel 12, as it is being extended, into the desired convex configuration is facilitated by an arcuate forming mouth 42, formed in the protective housing 44 which encloses the storage roller 13, throughwhich the panel 12 is extended. Depending upon the particular nature of the material 12, the rails 16 can be so orientated as to gradually converge outwardly toward the remote end thereof from the storage roller 14, or the rails can exactly parallel each other with the panel 12 immediately forming into the convex configuration as it is introduced to the near end of the rails 16 directly from the storage roller 14. If deemed necessary, appropriate arcuate transverse braces or supports can be provided at spaced points along the rails 16 for an additional stability or support of the extended panel 12.

A downwardly directed U-shaped end beam 46 is positioned transversely between the remote ends of the rails 16, preferably mounting directly on a transverse end wall 48. This end beam 46 is so formed as to present an arcuate upper edge which receives and supports the leading edge of the cover or panel 12. This beam supported panel edge is, as a final step to the positioning of the cover or canopy 12, clamped against the upper edge of the beam 46 by an overlying hold-down strap 50 pivotally fixed at one end to one of the enclosure side walls 32 and provided with an appropriate tensioning clamp on the opposite side wall for a positive downward drawing and clamping of the strap over the panel edge. In this manner, the sealing of the panel is completed peripherally thereabout.

Figure 4:
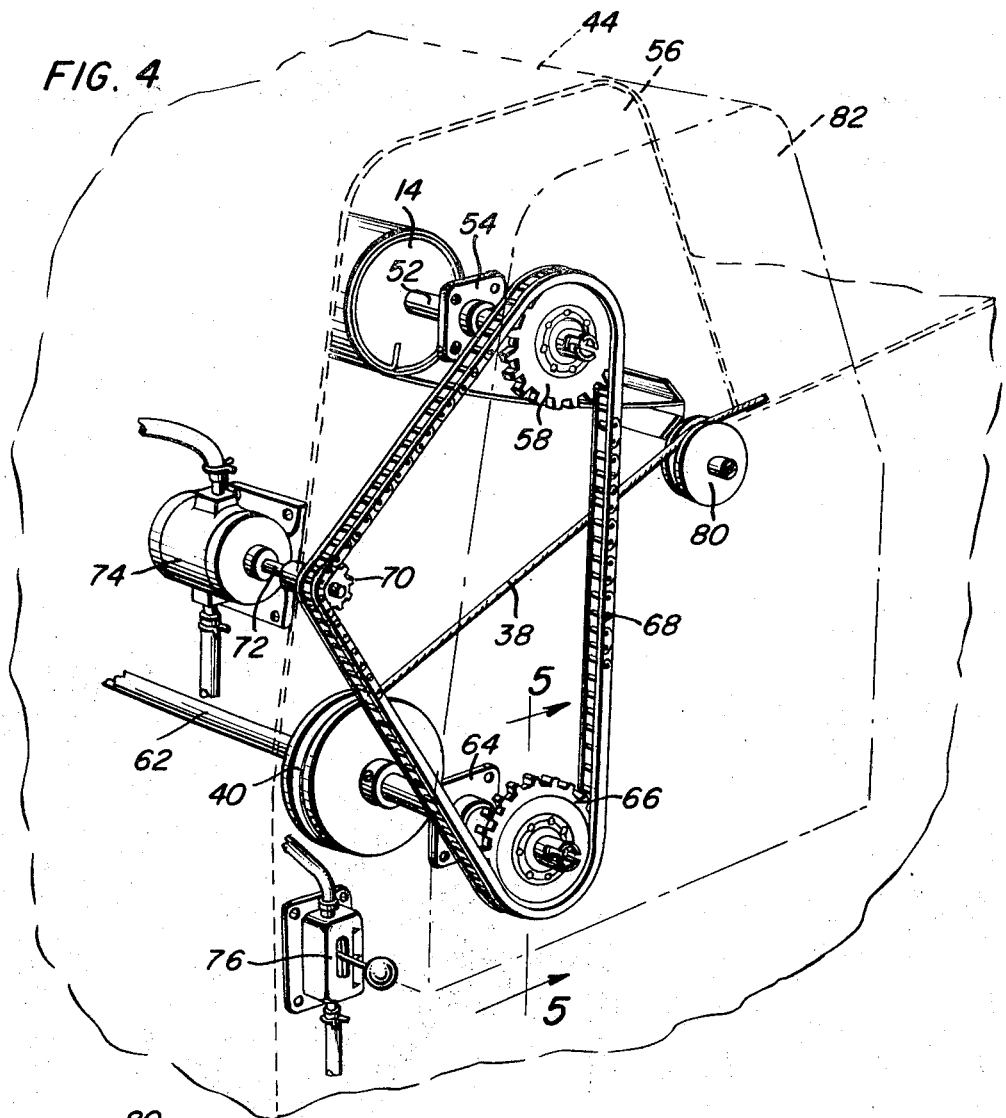
FIG. 4 is an enlarged perspective view of the control apparatus.

With reference to FIG. 4 in particular, the storage roller 14 to which the inner end of the panel 12, as well as the inner ends of the associated cables 38, are fixed, is mounted on an elongated shaft 52 which is in turn rotatably supported within appropriate bearing units 54 secured to the opposed end walls 56 of the housing 44. One end of the shaft 52 projects beyond the corresponding end wall 54 and mounts a sprocket 58 which is clutch engaged with the shaft 52 so as to transmit a drive to the shaft 52 only upon a rotation of the sprocket 58 clockwise as indicated by the direction arrow thereon for effecting a rolling of the panel 12 onto the storage roller 14.

Figure 2:
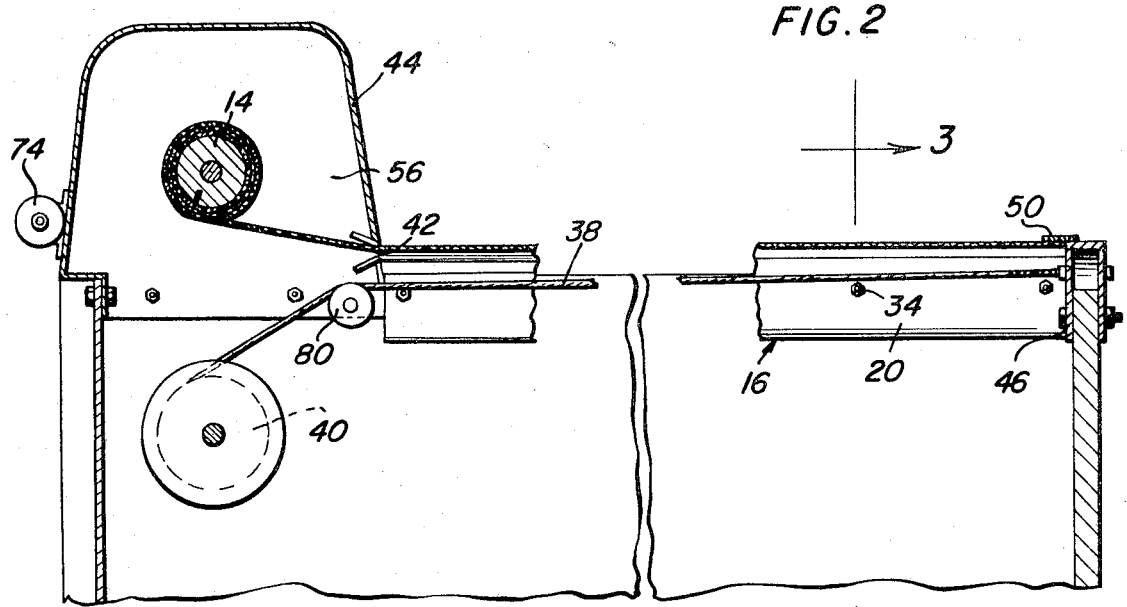
FIG. 2 is an enlarged partial cross-sectional view through the vehicle mounted canopy construction.
Figure 5:
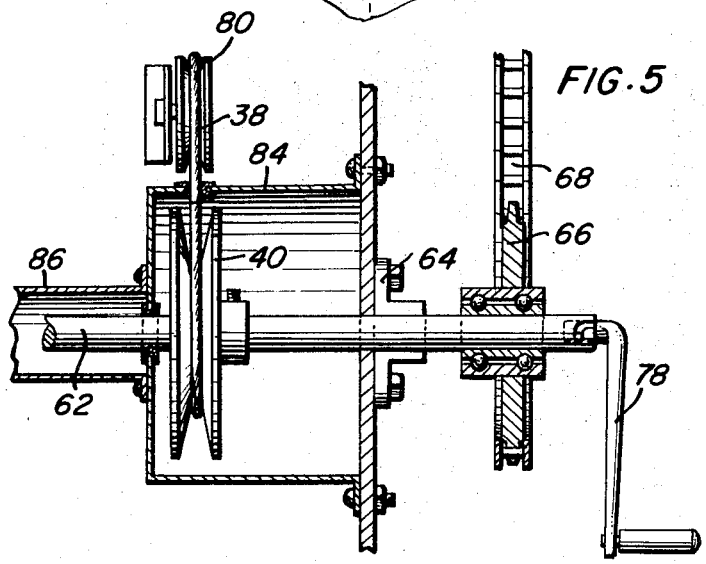
FIG. 5 is a cross-sectional detail taken substantially on a plane passing along line 4—4 and illustrating a control handle for manual operation of the construction.

The cable take-up rollers 40, which are in the nature of a pair of cable pulleys, are fixed to a common shaft 62 which parallels the storage roller shaft 52 in spaced relation therebelow. The shaft 62 is also mounted in a pair of opposed wall supported bearing units 64 with one end of the shaft 62 projecting and receiving a sprocket 66 thereon clutch engaged with the shaft 62 through a one-way clutch which drivingly engages the shaft 62 for a rotation thereof upon a counterclockwise rotation of the sprocket 66 as indicated by the direction arrow thereon. A continuous chain 68 engages about the two aligned shaft sprockets 58 and 66 as well as a drive sprocket 70 mounted on the drive shaft 72 of an appropriate motor 74. The motor 74 can be electric, hydraulic or pneumatic with the primary requirement being that the motor is reversible for effecting a selective driving of the storage roller shaft 52 clockwise for a rolling of the panel 12 thereon or a driving of the cable take-up shaft 62 counterclockwise for a winding of the cables 38 thereon and a corresponding extension of the panel 12. An appropriate control switch 76 for the motor 74 can be provided at any convenient location. Further, as an alternative to the power driving of the canopy extending and retracting mechanism, a simple manual crank handle 78, as suggested in FIG. 5, can be used, the handle 78 being selectively engaged with one or the other of the shaft 42 and 62 depending on the particular operation to be performed. Incidentally, with reference to FIGS. 2 and 4, attention is also directed to the fact that appropriate guide pulleys 80 can be provided for the cables 38 as required.

In the addition to the housing 44 which encloses and mounts the storage roller 14, it is contemplated that the apparatus include an appropriate external chain guard 82 about the sprockets and drive chain. Likewise, with reference to FIG. 5 in particular, a pulley cover 84 can be provided about each cable pulley 40 along with a tubular cover 86 about the pulley shaft 62 so as to protect the cable and other components from foreign matter or, in the case of a transport vehicle, the cargo. It will of course be appreciated that restricted openings will be provided for the cable 38 and shaft 62.

From the foregoing, it will be appreciated that a highly unique construction has been defined. This construction finds particular utility as a retractible canopy or cover for use in substantially any environment wherein such a cover is desirable, including vehicles of all types as well as non-mobile areas, such as camp sites, walkways, loading docks, and the like. The apparatus, particularly when mounted on a transport vehicle, sits above the load body end across only a small portion of one end thereof so as to in no way restrict the capacity of the load body or interfere with the loading or unloading thereof. By the same token, the side rails and end beam are specifically provided so as to lie along the body enclosing walls and likewise not restrict or in any way affect the load capacity.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A retractible panel construction comprising a pair of laterally spaced generally parallel side rails, a storage roller positioned transversely of said side rails at one end thereof, a panel consisting of a length of material rolled on said roller and selectively extensible therefrom along and between said rails, said material being of a width sufficient so as to completely span the distance between the rails, control means for selectively extending and retracting said panel, guide means engaged between said panel and said rails for a guiding of the panel therealong during the selective extension and retraction thereof, said guide means comprising an elongated upwardly facing groove along each side rail and a depending flange along each side of said panel slidably received within the rail grooves, the lateral spacing between the side rail grooves being less than the width of the panel material between the depending flanges as rolled on the storage roller with the material being sufficiently flexible to enable an arcuate upward flexing of the panel upon a movement of the material from the storage roller to the side rails where the panel flanges engage within the rail grooves, a protective housing enclosing said storage roller, said housing having a transversely arcuate panel forming mouth through which the panel is extending, the mouth being orientated between the storage roller and the adjacent ends of said rails and causing an initial upward flexing of the panel, and a support beam extending between the remote ends of the side rails, the support beam having an upwardly convex upper edge receiving and supporting the arcuately flexed leading end of the panel upon a complete extension thereof, said construction between the panel forming mouth and the support beam being free of panel supporting structure.

* * * * *